(12) United States Patent
Luo et al.

(10) Patent No.: US 12,532,097 B2
(45) Date of Patent: Jan. 20, 2026

(54) ELECTRONIC DEVICE

(71) Applicant: VIVO MOBILE COMMUNICATION CO., LTD., Guangdong (CN)

(72) Inventors: Xin Luo, Guangdong (CN); Weijing Wu, Guangdong (CN); Jian Ding, Guangdong (CN); Zimo Deng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 189 days.

(21) Appl. No.: 18/474,413

(22) Filed: Sep. 26, 2023

(65) Prior Publication Data

US 2024/0022843 A1 Jan. 18, 2024

Related U.S. Application Data

(63) Continuation of application No. PCT/CN2022/085025, filed on Apr. 2, 2022.

(30) Foreign Application Priority Data

Apr. 6, 2021 (CN) .......................... 202110367325.3

(51) Int. Cl.
  *H04R 1/02* (2006.01)
(52) U.S. Cl.
  CPC ............. *H04R 1/025* (2013.01); *H04R 1/021* (2013.01); *H04R 2499/15* (2013.01)
(58) Field of Classification Search
  CPC ..... H04R 1/025; H04R 1/021; H04R 2499/15
  USPC ......................................................... 381/386
  See application file for complete search history.

(56) References Cited

U.S. PATENT DOCUMENTS

| 10,594,845 B2 * | 3/2020 | Hébert ................ H04M 1/0249 |
| 2012/0020508 A1 | 1/2012 | Wang et al. |
| 2020/0177979 A1 | 6/2020 | Cho et al. |

FOREIGN PATENT DOCUMENTS

| CN | 102340710 A | 2/2012 |
| CN | 202679442 U | 1/2013 |
| CN | 106412776 A | 2/2017 |
| CN | 106714047 A | 5/2017 |
| CN | 209046878 U | 6/2019 |
| CN | 112261203 A | 1/2021 |
| CN | 112291394 A | 1/2021 |
| CN | 113099003 A | 7/2021 |
| JP | 2013255021 A | 12/2013 |

* cited by examiner

*Primary Examiner* — Sean H Nguyen
(74) *Attorney, Agent, or Firm* — Price Heneveld LLP

(57) ABSTRACT

An electronic device, pertaining to the field of communications technologies are provided. The electronic device includes: a display bracket; a speaker bracket, where the speaker bracket is disposed on the display bracket; a speaker, where the speaker is disposed on the speaker bracket, and the speaker is located on a side of the speaker bracket back away from the display bracket; and a main board bracket, where the main board bracket is connected to the display bracket, and the speaker bracket and the speaker are both located between the display bracket and the main board bracket. The speaker bracket, the speaker, and the main board bracket jointly create a closed rear cavity.

9 Claims, 5 Drawing Sheets

ELECTRONIC DEVICE

CROSS-REFERENCE TO RELATED APPLICATIONS

The present application is a continuation application of International Application No. PCT/CN2022/085025 filed on Apr. 2, 2022, which claims priority to Chinese Patent Application No. 202110367325.3, filed with the China National Intellectual Property Administration on Apr. 6, 2021 and entitled "ELECTRONIC DEVICE", which are incorporated herein by reference in their entireties.

TECHNICAL FIELD

This application pertains to the field of communications technologies, and specifically relates to an electronic device.

BACKGROUND

In existing electronic devices, multiple speakers are generally provided in order to meet the ever-increasing video and audio requirements of users.

Existing speakers are generally classified as closed speakers, semi-open speakers, open speakers, and the like. Most electronic devices are provided with a semi-open speaker to lower costs; however, semi-open speakers generally have a large rear cavity. Therefore, the speaker occupies a relatively large space in existing electronic devices.

SUMMARY

Embodiments of this application are intended to provide an electronic device.

An embodiment of this application provides an electronic device, where the electronic device includes:
- a display bracket;
- a speaker bracket, where the speaker bracket is disposed on the display bracket;
- a speaker, where the speaker is disposed on the speaker bracket, and the speaker is located on a side of the speaker bracket back away from the display bracket; and
- a main board bracket, where the main board bracket is connected to the display bracket, and the speaker bracket and the speaker are both located between the display bracket and the main board bracket; where
- the speaker bracket, the speaker, and the main board bracket jointly create a closed rear cavity.

In this embodiment of this application, in a case that the speaker disposed on the speaker bracket vibrates, it can vibrate the air in the closed rear cavity jointly created by the speaker bracket, the speaker, and the main board bracket. It can be seen that the closed rear cavity jointly created by the speaker bracket, the speaker, and the main board bracket can replace a speaker rear cavity created by other additional components. Therefore, in this embodiment of this application, fewer additional components are used for creating the speaker rear cavity, making the speaker occupy less space. In addition, due to good sealing of the closed rear cavity, fast-flowing gas generated during operation of the speaker cannot escape, thereby avoiding vibration caused by impact on other components of the electronic device, thus improving user experience.

REFERENCE SIGNS ARE DESCRIBED AS FOLLOWS

Figure 1:
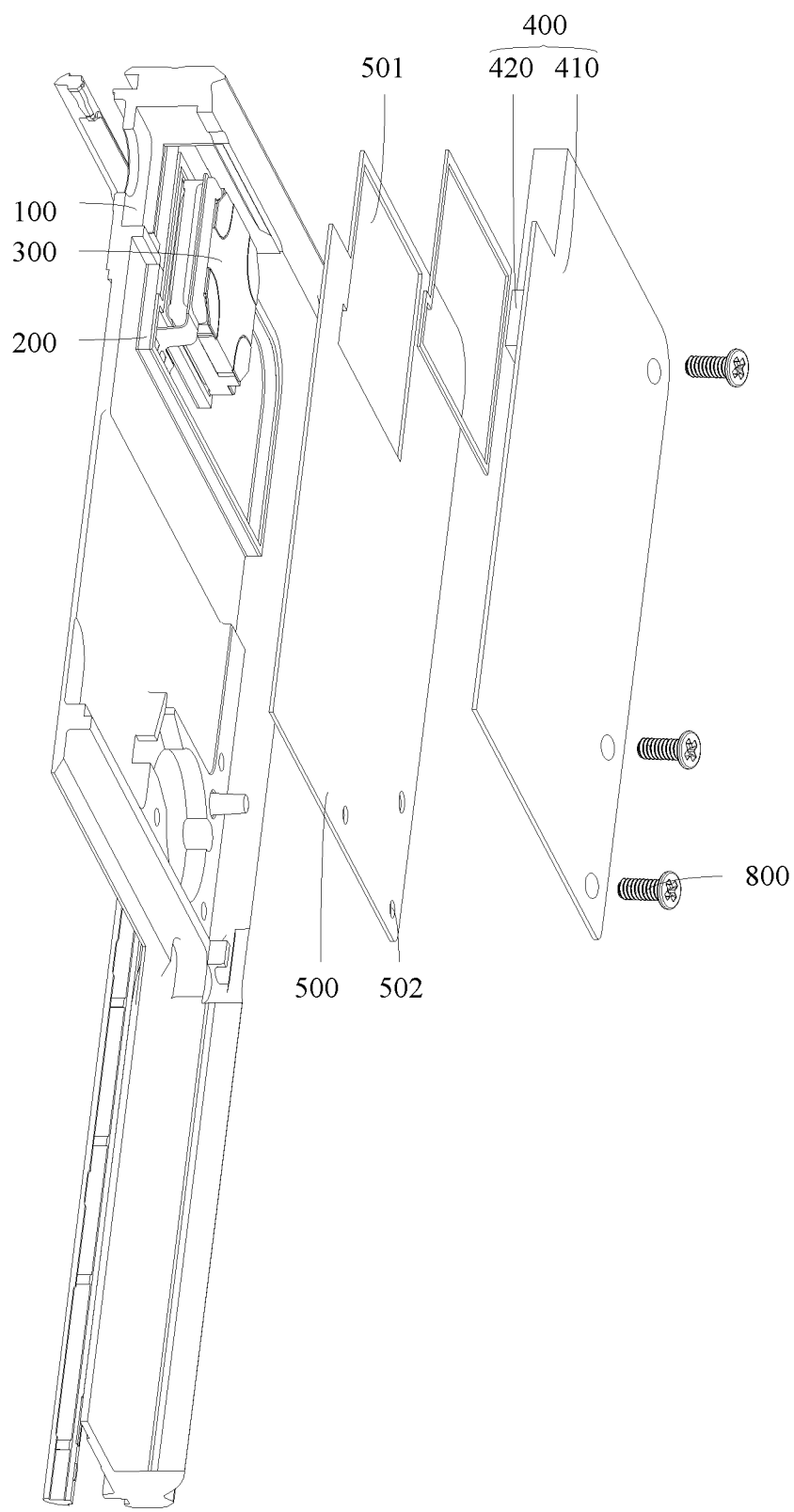
FIG. 1 is an exploded view of a partial structure of an electronic device according to an embodiment of this application.
Figure 2:
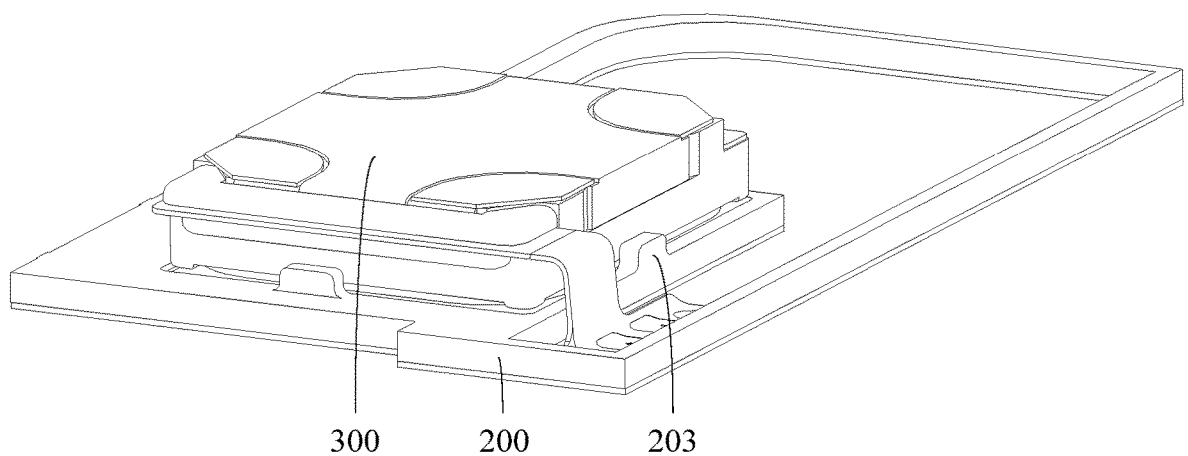
FIG. 2 and FIG. 3 are partial structural diagrams of an electronic device according to an embodiment of this application.
Figure 3:
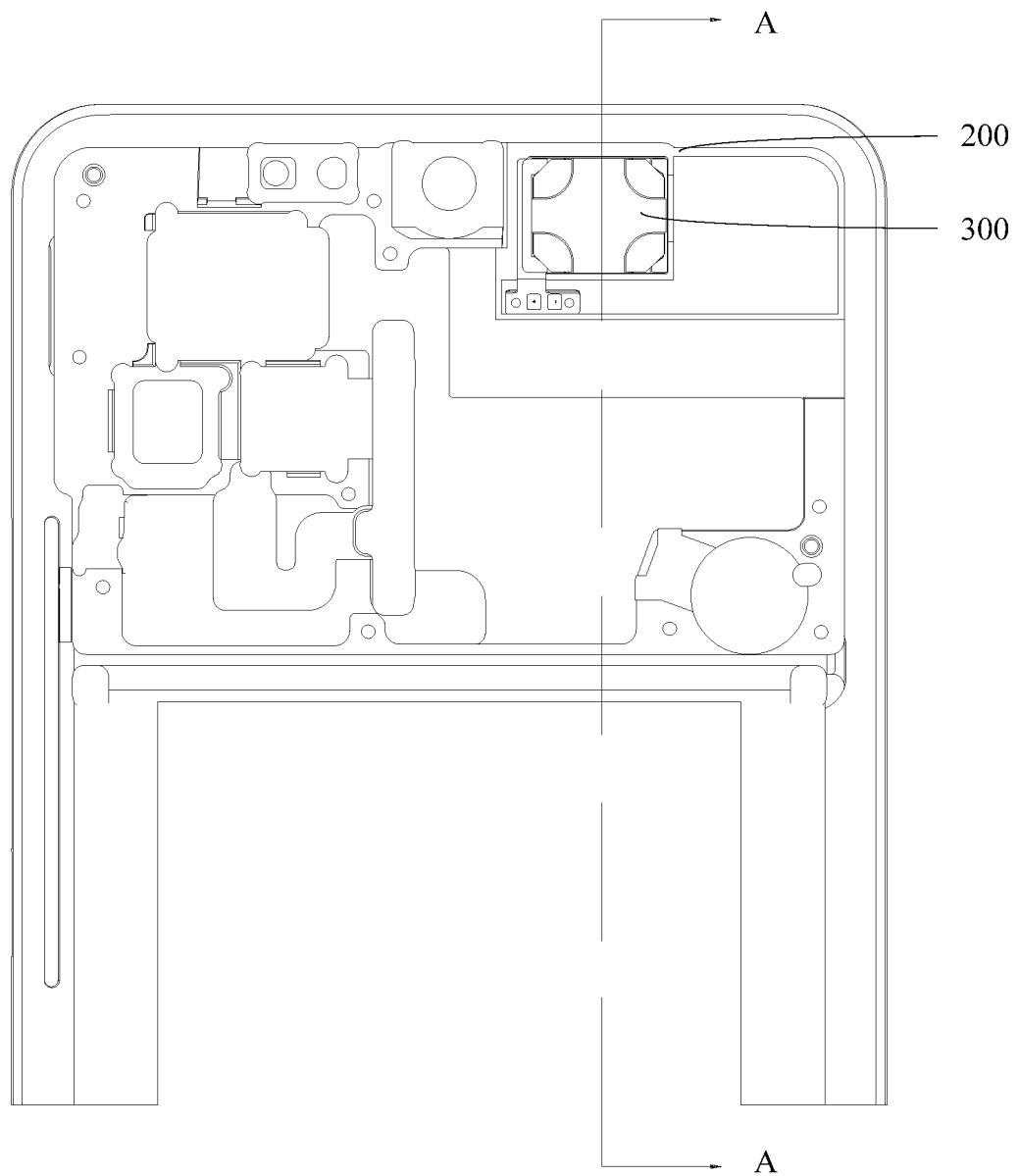
Figure 4:
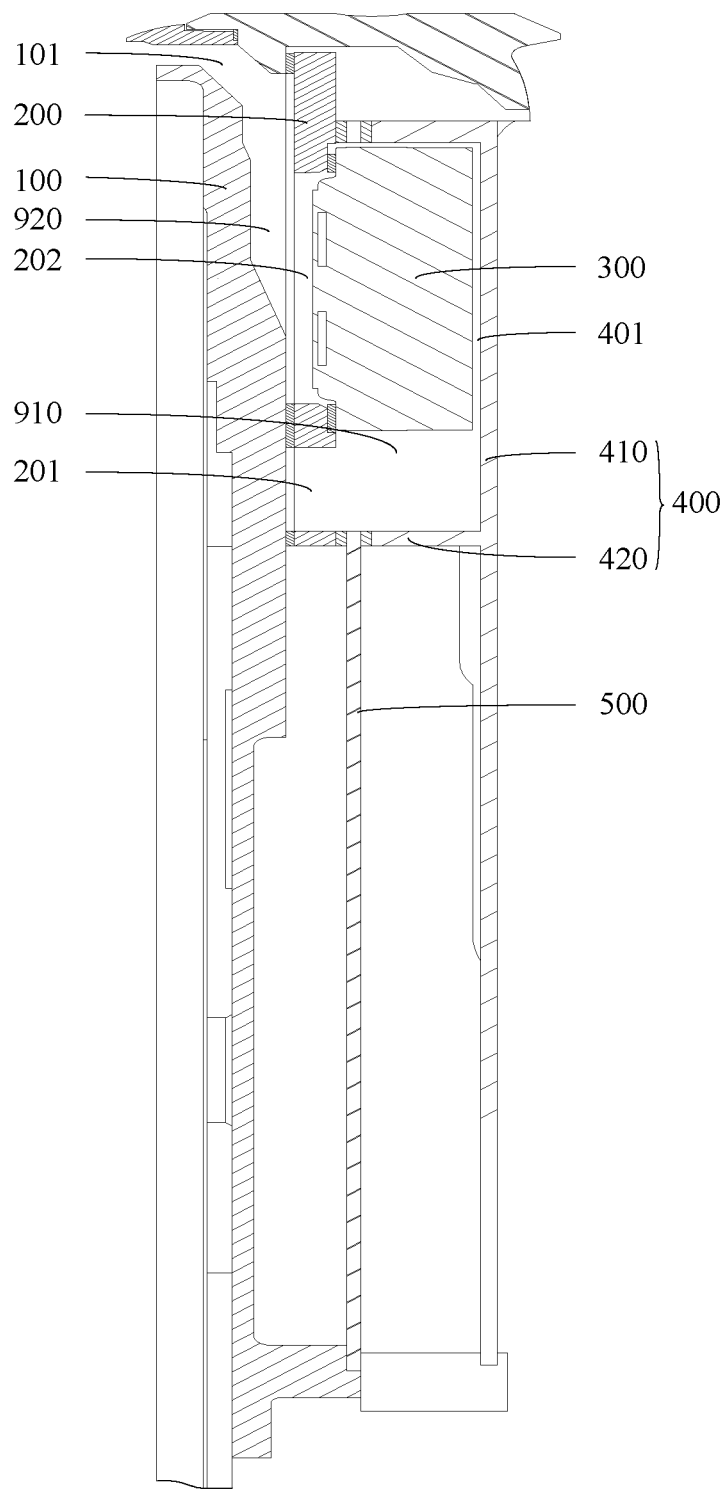
FIG. 4 is a sectional view along A-A of the electronic device in FIG. 3.

100—display bracket, 101—sound output channel;
200—speaker bracket, 201—first through hole, 202—second through hole, 203—limiting structure;
300—speaker;
400—main board bracket, 401—groove, 410—bracket body, 420—protrusion portion;
500—first main board, 501—avoidance hole, 502—perforation;
600—second main board;
700—support member;
800—fastener; and
910—closed rear cavity, and 920—speaker front cavity.

DESCRIPTION OF EMBODIMENTS

The following clearly and describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that the data used in this way is interchangeable in appropriate circumstances, such that the embodiments of this application can be implemented in other orders than the order illustrated or described herein. In addition, objects distinguished by "first", "second", and the like are generally of a same type, and the number of the objects are not limited. For example, there may be one or more first objects. In addition, "and/or" in the specification and claims represents at least one of connected objects, and the character "/" generally indicates that the associated objects have an "or" relationship.

With reference to the accompanying drawings, the following describes in detail the electronic device provided in embodiments of this application through specific embodiments and application scenarios thereof.

As shown in FIG. 1 to FIG. 4, an electronic device is provided in an embodiment of this application. The electronic device includes a display bracket 100, a speaker bracket 200, a speaker 300, and a main board bracket 400.

The display bracket 100 is a carrier of the display and other internal components of the electronic device, and also a mounting base for the speaker bracket 200.

The speaker bracket 200 is disposed on the display bracket 100, and the speaker bracket 200 is a mounting base for the speaker 300. The speaker bracket 200 may further be provided with a limiting structure 203 for positioning the speaker 300. The limiting structure 203 can prevent the speaker 300 from moving within the electronic device, thereby avoiding effects on a sound-producing function of the speaker 300 and preventing the speaker 300 from colliding with other functional components within the electronic device.

The speaker 300 is disposed on the speaker bracket 200, and the speaker 300 is on a side of the speaker bracket 200 back away from the display bracket 100. The speaker 300 vibrates surrounding air to generate a sound.

The main board bracket 400 is connected to the display bracket 100, and the speaker bracket 200 and the speaker 300 are both located between the display bracket 100 and the main board bracket 400.

The speaker bracket 200, the speaker 300, and the main board bracket 400 jointly create a closed rear cavity 910, and the speaker 300 vibrates air in the closed rear cavity 910 to generate a sound. A sealing component such as a double-sided adhesive or foam, may be used for sealing between the speaker bracket 200, the speaker 300, and the main board bracket 400, thereby completely sealing the closed rear cavity 910, thus preventing gas from escaping the closed rear cavity 910.

In this embodiment of this application, in a case that the speaker 300 disposed on the speaker bracket 200 vibrates, it can vibrate the air in the closed rear cavity 910 jointly created by the speaker bracket 200, the speaker 300, and the main board bracket 400. It can be seen that the closed rear cavity 910 jointly created by the speaker bracket 200, the speaker 300, and the main board bracket 400 can replace a speaker rear cavity created by other additional components. Therefore, in this embodiment of this application, fewer additional components are used for creating the speaker rear cavity, making the speaker occupy less space. In addition, due to good sealing of the closed rear cavity 910, fast-flowing gas generated during operation of the speaker 300 cannot escape, thereby avoiding vibration caused by impact on other components of the electronic device, thus improving user experience. Furthermore, the closed rear cavity 910 created may be concentrated around the speaker 300, covering a smaller area, thus allowing easier sealing and lowering the risk of gas leak.

As the size of the closed rear cavity 910 of the speaker affects sound quality of the speaker, in an embodiment, the speaker bracket 200 is provided with a first through hole 201 to enlarge the closed rear cavity 910, where the first through hole 201 faces the display bracket 100, and the speaker bracket 200, the speaker 300, the main board bracket 400, and the display bracket 100 jointly create the closed rear cavity 910. In this embodiment, the first through hole 201 is provided on the speaker bracket 200, so that the display bracket 100 can participate in creating the closed rear cavity 910. In this way, volume of the closed rear cavity 910 can be increased; and since the speaker bracket 200 is provided with the first through hole 201, the speaker bracket 200 can be made into a smaller size and in turn a smaller mass, so the entire electronic device can be made lighter.

Further, the electronic device includes a first main board 500, and the first main board 500 is disposed on the main board bracket 400. Optionally, the first main board 500 may be connected to a side of the main board bracket 400, in which case the speaker bracket 200 and the first main board 500 may not be directly connected to each other. In this embodiment, the speaker bracket 200, the speaker 300, the main board bracket 400, and the display bracket 100 jointly create the closed rear cavity 910, and the first main board 500 does not participate in creating the closed rear cavity 910. In another embodiment, the speaker bracket 200, the speaker 300, the first main board 500, the main board bracket 400, and the display bracket 100 jointly create the closed rear cavity 910. That is, the first main board 500 participates in creating the closed rear cavity 910, in which case the first main board 500 may be disposed between the speaker bracket 200 and the main board bracket 400, so that part of surface of the first main board 500 can be used for creating the closed rear cavity 910. As the first main board 500 can also participate in creating the closed rear cavity 910, the additional components used for creating the closed rear cavity 910 in the electronic device can be further reduced, or even no additional components are required for creating the closed rear cavity 910. Thus, this embodiment can further reduce the space occupied by the speaker.

In a further embodiment, the first main board 500 may be totally provided on a side of the closed rear cavity 910. In this case, since the first main board 500 has to create the closed rear cavity 910 together with the speaker bracket 200, the speaker 300, the main board bracket 400, and the display bracket 100, edge of the first main board 500 can only extend to edge of the closed rear cavity 910, resulting in a small area of the first main board 500, and consequently no additional components can be integrated on the first main board 500. Therefore, the first main board 500 may be provided with an avoidance hole 501, and a part of the speaker 300 is located in the avoidance hole 501. That is, the first main board 500 surrounds the speaker 300 via the avoidance hole 501, so the space around the speaker 300 can be utilized, and thus a first main board 500 having a larger area can be provided.

In a further optional embodiment, in the case that the main board bracket 400 participates in creating the closed rear cavity 910, the electronic device will have an increased thickness due to the thickness of the main board bracket 400, affecting grip feeling of the user using the electronic device. Therefore, a groove 401 is provided on a side of the main board bracket 400 facing the speaker bracket 200. The groove 401 is in communication with the avoidance hole 501, a part of the speaker 300 is located in the groove 401, and the closed rear cavity 910 includes a space created by side walls of the groove 401 and the speaker 300. In the foregoing implementation, since a part of the speaker 300 can be located in the groove 401, the main board bracket 400 can be closer to the display bracket 100, so that the thickness of the electronic device can be smaller, improving the grip feeling of the user. In addition, in this case, due to the existence of the groove 401, the volume of the closed rear cavity 910 is not reduced even in a case that the main board bracket 400 is closer to the display bracket 100.

In an optional embodiment, the first main board 500 is attached to the main board bracket 400. In this arrangement, the usable area of the first main board 500 is only its part not attached to the main board bracket 400, so only a small area of the first main board 500 can be utilized, causing a low utilization rate of the first main board 500. Therefore, in other embodiments, the main board bracket 400 includes a bracket body 410 and a protrusion portion 420. The protrusion portion 420 is provided on a side of the bracket body 410 facing the speaker bracket 200, the bracket body 410 and the protrusion portion 420 jointly form a groove 401, and a gap is present between the first main board 500 and the bracket body 410. In this embodiment, the speaker 300 can be accommodated in the groove 401 formed by the bracket body 410 and the protrusion portion 420, thereby reducing the thickness of the electronic device. Moreover, the gap between the first main board 500 and the bracket body 410 allows components to be arranged on both sides of the first main board 500, improving the utilization rate of the first main board 500. In addition, the gap between the first main board 500 and the bracket body 410 also allows heat generated by the first main board 500 to be led out, thereby improving a heat dissipation effect of the electronic device.

In another optional embodiment, an orthographic projection area of the groove 401 may be smaller or larger than an orthographic projection area of the avoidance hole 501 in a direction perpendicular to the first main board 500. In the case that the orthographic projection area of the groove 401 is smaller than the orthographic projection area of the avoidance hole 501, a cover area of the groove 401 is smaller than the area of the avoidance hole 501, so that the volume of the closed rear cavity 910 is reduced; in the case that the orthographic projection of the groove 401 is larger than the orthographic projection of the avoidance hole 501, a part of the groove 401 presses the main board at a position close to the center of the main board, and as a result, the first main board 500 may be damaged in the presence of densely arranged components on the first main board 500. Therefore, the orthographic projection of the groove 401 and the orthographic projection of the avoidance hole 501 can be made to coincide, so that not only the foregoing problems can be avoided, but also the closed rear cavity 910 created has a more regular shape, allowing more smooth gas flowing in the closed rear cavity 910. In addition, with the orthographic projection of the groove 401 coinciding with the orthographic projection of the avoidance hole 501, the first main board 500 can be supported by the speaker bracket 200 in the part where the first main board 500 is in contact with the protrusion portion 420, avoiding the problem that the first main board 500 is prone to bending.

In an embodiment, the first main board 500 may be fixedly connected to the display bracket 100 via a colloid, where the colloid may be an adhesive substance such as double-sided adhesive. However, in this manner, the adhesion of the colloid is impacted by high temperatures, and therefore, the manner has poor reliability. Therefore, the first main board 500 may be provided with a perforation 502, and the main board bracket 400 is fixedly connected to the display bracket 100 via a fastener 800. One end of the fastener 800 passes through the perforation 502, and the fastener 800 may be a screw, a bolt, or the like, which is not limited in this embodiment of this application. The connection between the main board bracket 400, the first main board 500, and the display bracket 100 can be made more secure and reliable by the fastener 800, and the sealing of the closed rear cavity 910 can be improved by the connection via the fastener 800.

Figure 5:
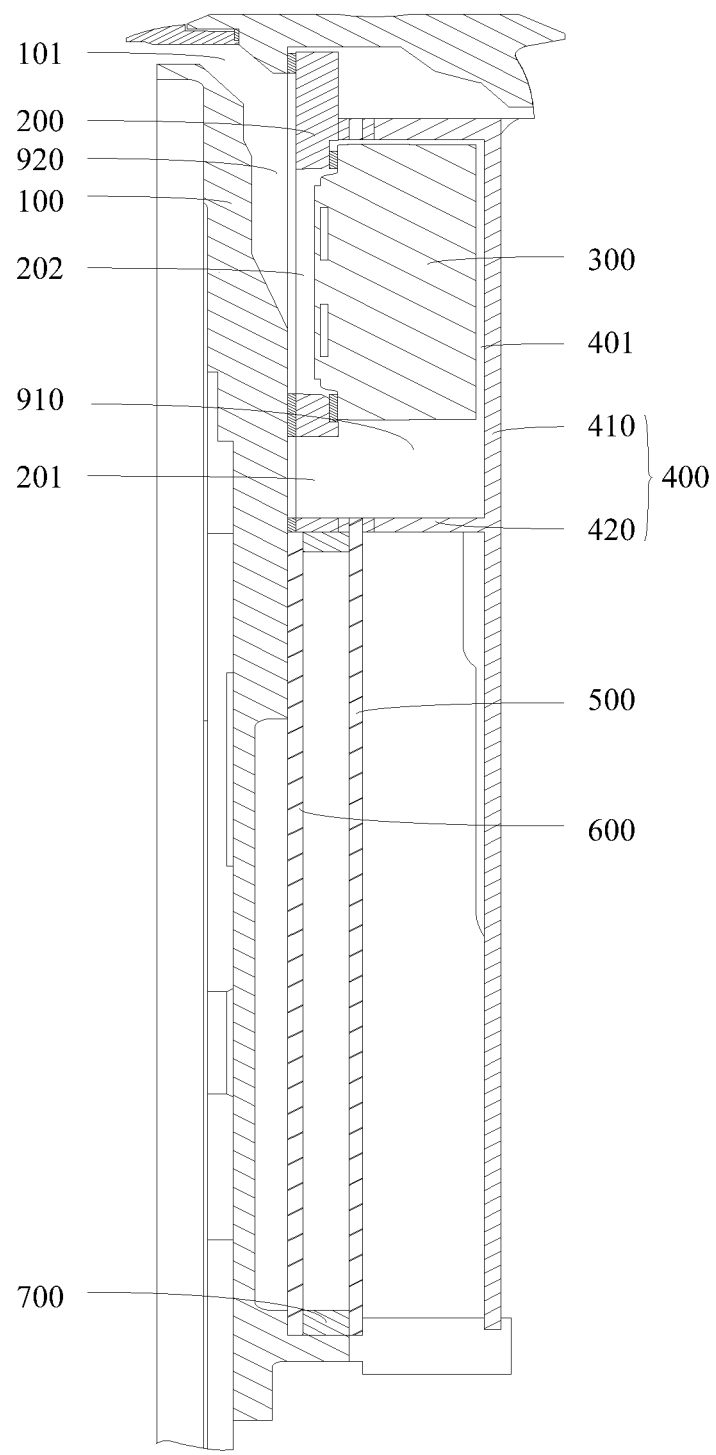
FIG. 5 is a partial structural diagram of an electronic device according to another embodiment of this application.

In another embodiment, in a case that there is only the first main board 500 in the electronic device, fewer components can be integrated on the first main board 500 due to a limited area. Therefore, as shown in FIG. 5, the electronic device may further include a second main board 600 and a support member 700. The second main board 600 is connected to the first main board 500 via the support member 700, and the second main board 600 is located in a space jointly created by the speaker bracket 200, the first main board 500, and the display bracket 100. In this embodiment, more components can be integrated through the addition of the second main board 600, and the first main board 500 and the second main board 600 can be separated by the support member 700, preventing the interaction between the first main board 500 and the second main board 600. In addition, the space created by the speaker bracket 200, the first main board 500, and the display bracket 100 can be used to lead out heat generated by the first main board 500 and the second main board 600, thereby improving the heat dissipation effect of the electronic device.

In an optional embodiment, the display bracket 100 is provided with a sound output channel 101. The speaker bracket 200 is provided with a second through hole 202, and the second through hole 202 is in communication with the sound output channel 101. The display bracket 100, the speaker bracket 200, and the speaker 300 jointly create a speaker front cavity 920, and the speaker front cavity 920 is located on a side of the speaker 300 back away from the main board bracket 400. In a case that the speaker 300 provided on the speaker bracket 200 vibrates, it can vibrate the air in the speaker front cavity 920, thereby generating sound waves, and then lead out sound through the sound output channel 101, so that the user can hear the sound emitted by the electronic device. The second through hole 202 provided in the speaker bracket 200 can not only lead out the sound generated by the speaker 300 through the sound output channel 101, but also reduce the volume of the speaker bracket 200, thus reducing the weight of the speaker bracket 200 and in turn making the electronic device lighter.

The electronic device disclosed in the embodiments of this application may be a smartphone, a tablet computer, an electronic book reader, a wearable device (such as a smart watch), an electronic game machine, or the like. Embodiments of this application do not limit the specific type of the electronic device.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. An electronic device, comprising:
  a display bracket;
  a speaker bracket, wherein the speaker bracket is disposed on the display bracket;
  a speaker, wherein the speaker is disposed on the speaker bracket, and the speaker is located on a side of the speaker bracket back away from the display bracket; and
  a main board bracket, wherein the main board bracket is connected to the display bracket, and the speaker bracket and the speaker are both located between the display bracket and the main board bracket; wherein
  the speaker bracket, the speaker, and the main board bracket jointly create a closed rear cavity;
  wherein the speaker bracket is provided with a first through hole, wherein the first through hole faces the display bracket, and the speaker bracket, the speaker, the main board bracket, and the display bracket jointly create the closed rear cavity.

2. The electronic device according to claim 1, wherein the electronic device further comprises a first main board, wherein the first main board is disposed on the main board bracket, the speaker bracket is connected to the first main board, the speaker bracket is located on a side of the first main board back away from the main board bracket, and the speaker bracket, the speaker, the first main board, the main board bracket, and the display bracket jointly create the closed rear cavity.

3. The electronic device according to claim 2, wherein the first main board is provided with an avoidance hole, and a part of the speaker is located in the avoidance hole.

4. The electronic device according to claim 3, wherein a side of the main board bracket facing the speaker bracket is provided with a groove, wherein the groove is in communication with the avoidance hole, a part of the speaker is located in the groove, and the closed rear cavity comprises a space enclosed by side walls of the groove and the speaker.

5. The electronic device according to claim 4, wherein the main board bracket comprises a bracket body and a protrusion portion, wherein the protrusion portion is disposed on a surface of the bracket body facing the speaker bracket, the bracket body and the protrusion portion jointly form the groove, and a gap is present between the first main board and the bracket body.

6. The electronic device according to claim 4, wherein in a direction perpendicular to the first main board, an orthographic projection of the groove coincides with an orthographic projection of the avoidance hole.

7. The electronic device according to claim 2, wherein the first main board is provided with a perforation, the main board bracket is fixedly connected to the display bracket via a fastener, and one end of the fastener passes through the perforation.

8. The electronic device according to claim 2, wherein the electronic device further comprises a second main board and a support member, wherein the second main board is connected to the first main board via the support member, and the second main board is located in a space jointly created by the speaker bracket, the first main board, and the display bracket.

9. The electronic device according to claim 1, wherein the display bracket is provided with a sound output channel, the speaker bracket is provided with a second through hole, the second through hole is in communication with the sound output channel, and the display bracket, the speaker bracket, and the speaker jointly create a speaker front cavity, the speaker front cavity is located on a side of the speaker back away from the main board bracket.

* * * * *